(12) United States Patent
Nakamura

(10) Patent No.: US 9,247,009 B2
(45) Date of Patent: Jan. 26, 2016

(54) SERVICE PROVIDING SYSTEM AND A METHOD OF PROVIDING SERVICE

(71) Applicant: Shuuichi Nakamura, Kanagawa (JP)

(72) Inventor: Shuuichi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/271,527

(22) Filed: May 7, 2014

(65) Prior Publication Data

US 2014/0333963 A1 Nov. 13, 2014

(30) Foreign Application Priority Data

May 10, 2013 (JP) .................. 2013-100632
Apr. 24, 2014 (JP) .................. 2014-089897

(51) Int. Cl.
*G06F 3/12* (2006.01)
*G06F 15/173* (2006.01)
*H04L 29/08* (2006.01)

(52) U.S. Cl.
CPC .................. *H04L 67/16* (2013.01)

(58) Field of Classification Search
None
See application file for complete search history.

(56) References Cited

U.S. PATENT DOCUMENTS

| | | | | |
|---|---|---|---|---|
| 6,369,909 B1 * | 4/2002 | Shima | ............. | G06F 3/1206 358/1.13 |
| 7,016,062 B2 * | 3/2006 | Ishizuka | ............. | G06Q 30/0613 358/1.15 |
| 7,460,261 B2 * | 12/2008 | Itoh | ............. | G06F 3/1204 358/1.15 |
| 7,991,778 B2 * | 8/2011 | Hull | ............. | G06K 9/00442 707/741 |
| 8,526,037 B2 * | 9/2013 | Emori | ............. | G06F 21/608 358/1.14 |
| 2002/0087622 A1 * | 7/2002 | Anderson | ............. | H04N 1/00148 709/203 |
| 2003/0002072 A1 * | 1/2003 | Berkema | ............. | G06F 3/1205 358/1.15 |
| 2004/0160630 A1 * | 8/2004 | Iriyama | ............. | H04N 1/00204 358/1.15 |
| 2004/0190049 A1 * | 9/2004 | Itoh | ............. | G06F 3/1204 358/1.15 |
| 2005/0097472 A1 * | 5/2005 | Machida | ............. | G06F 3/0481 715/736 |
| 2010/0079785 A1 * | 4/2010 | Emori | ............. | G06F 21/608 358/1.14 |
| 2014/0016161 A1 * | 1/2014 | Yamada | ............. | G06F 3/1293 358/1.15 |
| 2014/0016816 A1 * | 1/2014 | Yamada | ............. | G06F 3/1204 382/100 |

FOREIGN PATENT DOCUMENTS

| | | |
|---|---|---|
| JP | 2007-108947 | 4/2007 |
| JP | 2009-296357 | 12/2009 |
| JP | 2014/010711 A1 | 1/2014 |
| JP | 2014-016896 | 1/2014 |
| JP | 2014-016897 | 1/2014 |
| JP | 2014-016898 | 1/2014 |
| JP | 2014-016899 | 1/2014 |
| JP | 2014-032661 | 2/2014 |

\* cited by examiner

*Primary Examiner* — Marcus T Riley
(74) *Attorney, Agent, or Firm* — IPUSA, PLLC

(57) ABSTRACT

A service providing system includes an operation terminal that includes a service information acquiring unit of acquiring service information indicative of at least one service and information of an apparatus to be used related to an electronic apparatus used for the at least one service, a receiving unit that receives a selection of one service, an apparatus information acquiring unit that acquires apparatus information determining at least one electronic apparatus, an apparatus information sending unit that sends the apparatus information through a previously defined interface; and an information processing apparatus that includes a service information sending unit that sends the service information and the information of the apparatus, and a service providing unit that provides the one service by controlling the at least one electronic apparatus by a cooperation method corresponding to the one service determined by the apparatus information sent from the operation terminal through the previously defined interface.

8 Claims, 20 Drawing Sheets

FIG.13

PROJECTOR X IS SELECTED.

PLEASE DESIGNATE
PROJECTION CONDITION

1. PROJECTION INSTRUCTION
   : USER INPUT
2. TERMINAL FOR INSTRUCTION
   : CURRENT SMARTPHONE
...

FIG.16

| APPARATUS IDENTIFICATION INFORMATION | APPARATUS TYPE | ADDRESS | CORRESPONDING DATA FORMAT |
|---|---|---|---|
| PJS101 | PROJECTOR | 192.160.180.11 | jpeg, pdf |
| PJS102 | PROJECTOR | 192.160.180.10 | jpeg |
| MFP11 | MULTIFUNCTION PERIPHERAL | 190.16.18.15 | RPCS, pdf, jpg |
| IWB21 | INTERACTIVE WHITEBOARD | 190.16.18.15 | jpeg, doc, xls, ppt, pdf |

FIG.21

| WORKFLOW IDENTIFICATION INFORMATION | WORKFLOW NAME | APPARATUS TO BE USED |
|---|---|---|
| 0001 | SCAN to PRINTER | (SCANNER-MFP)-(PRINTER-MFP) |
| 0002 | SCAN to PROJECTOR | (SCANNER-MFP)-PROJECTOR |
| 0003 | CAMERA to PROJECTOR | CAMERA-PROJECTOR |
| 0004 | WHITEBOARD to PRINTER | WHITEBOARD-PRINTER |
| 0005 | MICROPHONE to DISPLAY | MICROPHONE-DISPLAY |

FIG.22

| APPARATUS NAME | SETUP ITEM |
|---|---|
| MFP | INPUT: DATA FORMAT/AGGREGATION/COLOR/WHETHER DATA ARE HELD AFTER SCAN /WHETHER THERE IS INSTRUCTION OF USER OUTPUT: AGGREGATION/DOUBLE SIDE/COLOR/STAPLE/PUNCH/TONER SAVE /WHETHER THERE IS INSTRUCTION OF USER |
| SCANNER | DATA FORMAT/AGGREGATION/COLOR/WHETHER DATA ARE HELD AFTER SCAN /WHETHER THERE IS INSTRUCTION OF USER |
| PROJECTOR | PROJECTION INSTRUCTION/SETUP OF TERMINAL FOR INSTRUCTION |
| PRINTER | AGGREGATION/DOUBLE SIDE/COLOR/STAPLE/PUNCH/TONER SAVE /WHETHER THERE IS INSTRUCTION OF USER |
| CAMERA | RESOLUTION/DATA FORMAT/WHETHER DATA ARE HELD AFTER CAPTURE /WHETHER THERE IS INSTRUCTION OF USER |
| WHITEBOARD | INPUT: DATA FORMAT/COLOR/WHETHER DATA ARE HELD /WHETHER THERE IS INSTRUCTION OF USER OUTPUT: INSTRUCTION OF OUTPUT/SETUP OF TERMINAL FOR INSTRUCTION |

SERVICE PROVIDING SYSTEM AND A METHOD OF PROVIDING SERVICE

BACKGROUND OF THE INVENTION

1. Field of the Invention

The present invention generally relates to a service providing system and a method of providing service.

2. Description of the Related Art

There is a data input and output processing system in which identification information corresponding to portions of a data input and output apparatus or identification information displayed on a display portion of the data input and output apparatus are optically read by using an operation device and the data input and output apparatus is controlled based on the read identification information as disclosed in Japanese Laid-open Patent Application No. 2007-108947.

Recently, a user uses various operation terminals such as various electronic apparatuses including a printer for outputting electronic data, a multifunction peripheral, and a projector, a mobile phone, a smartphone, and a tablet terminal. In a mode (system) of using the electronic apparatus or the operation terminal, an improvement in a utility value is expected by cooperation between various electronic apparatuses and operation terminals.

However, in an exemplary system using the electronic apparatus or the operation terminal, there is no structure of providing multiple services using one or more electronic apparatuses included in multiple electronic apparatuses connected to the system.

SUMMARY OF THE INVENTION

Accordingly, embodiments of the present invention provide a novel and useful service providing system and a method of providing service solving one or more of the problems discussed above.

One aspect of the embodiments of the present invention may be to provide a service providing system including an operation terminal; and an information processing apparatus connected with the operation terminal, wherein the operation terminal includes a service information acquiring unit that acquires service information indicative of at least one service and information of an apparatus to be used related to an electronic apparatus used for the at least one service from the information processing apparatus, a receiving unit that receives a selection of one service out of the at least one service indicated by the service information, an apparatus information acquiring unit that acquires apparatus information determining at least one electronic apparatus included in a plurality of electronic apparatuses, which are connected with the service providing system, based on the information of the apparatus to be used related to the electronic apparatus that is used for the one service, of which selection is received by the receiving unit, and an apparatus information sending unit that sends the apparatus information acquired by the apparatus information acquiring unit to the information processing apparatus through an interface that is previously defined in response to the one service, of which selection is received by the receiving unit, wherein the information processing apparatus includes a service information sending unit sends the service information and the information of the apparatus to be used to the operation terminal, and a service providing unit that provides the one service by controlling the at least one electronic apparatus by a cooperation method corresponding to the one service using the at least one electronic apparatus that is determined by the apparatus information sent from the operation terminal through the interface that is previously defined in response to the one service.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

An embodiment of the present invention is provided in consideration of the above. An object of the present invention is to provide a service providing system and a method of providing a service by which multiple services can be provided using one or more electronic apparatuses included in the multiple electronic apparatuses.

BRIEF DESCRIPTION OF THE DRAWINGS

FIG. 13 is an exemplary image chart of a setup screen for setting up an output condition;

FIG. 16 illustrates an exemplary structure of an apparatus management table;

FIG. 21 illustrates an exemplary structure of a workflow database;

FIG. 22 illustrates an exemplary structure of a table of setup items for each apparatus.

DETAILED DESCRIPTION OF THE PREFERRED EMBODIMENTS

A description is given below, with reference to the FIG. 1 through FIG. 23 of embodiments of the present invention. Where the same reference symbols are attached to the same parts, repeated description of the parts is omitted.

Reference symbols typically designate as follows:
1: service providing system;
10: information accumulating apparatus;
11: smartphone;
12: tablet terminal;
13: MFP (multifunction peripheral);
14: projector;
15: digital camera;
16: microphone;
17: speaker;
18: server;
19: interactive whiteboard;
21, 31: OS;
22: web server;
24: WebUI;
26: WebApi;
27: shared folder;
28: document administrating unit;
29: web control part;
32: information accumulating apparatus communication unit;
33: workflow list acquiring unit;
34: workflow selection receiving unit;
35: setup receiving unit;
36: workflow information sending unit;
37: input and output instruction receiving unit;
100: computer system;
101: input device;
102: output device;
103: external I/F;
103a: recording medium;
104: RAM;
105: ROM;
106: CPU;
107: communication I/F;
108: HDD;
601: CPU;
602: ROM;
603: RAM;
604: EEPROM;
605: CMOS sensor;
606: acceleration and direction sensor;
607: record media;
608: media drive;
609: audio input unit;
610: audio output unit;
611: antenna;
612: communication unit;
613: wireless LAN communication unit;
614: short-range wireless communication antenna;
615: short-range wireless communication unit;
616: display;
617: touch panel;
618: battery;
619: bus line;
B: bus; and
N1: network.

A description is given below, with reference to the FIG. 1 through FIG. 23 of embodiments of the present invention.
[First Embodiment]
<System Structure>

Figure 1:
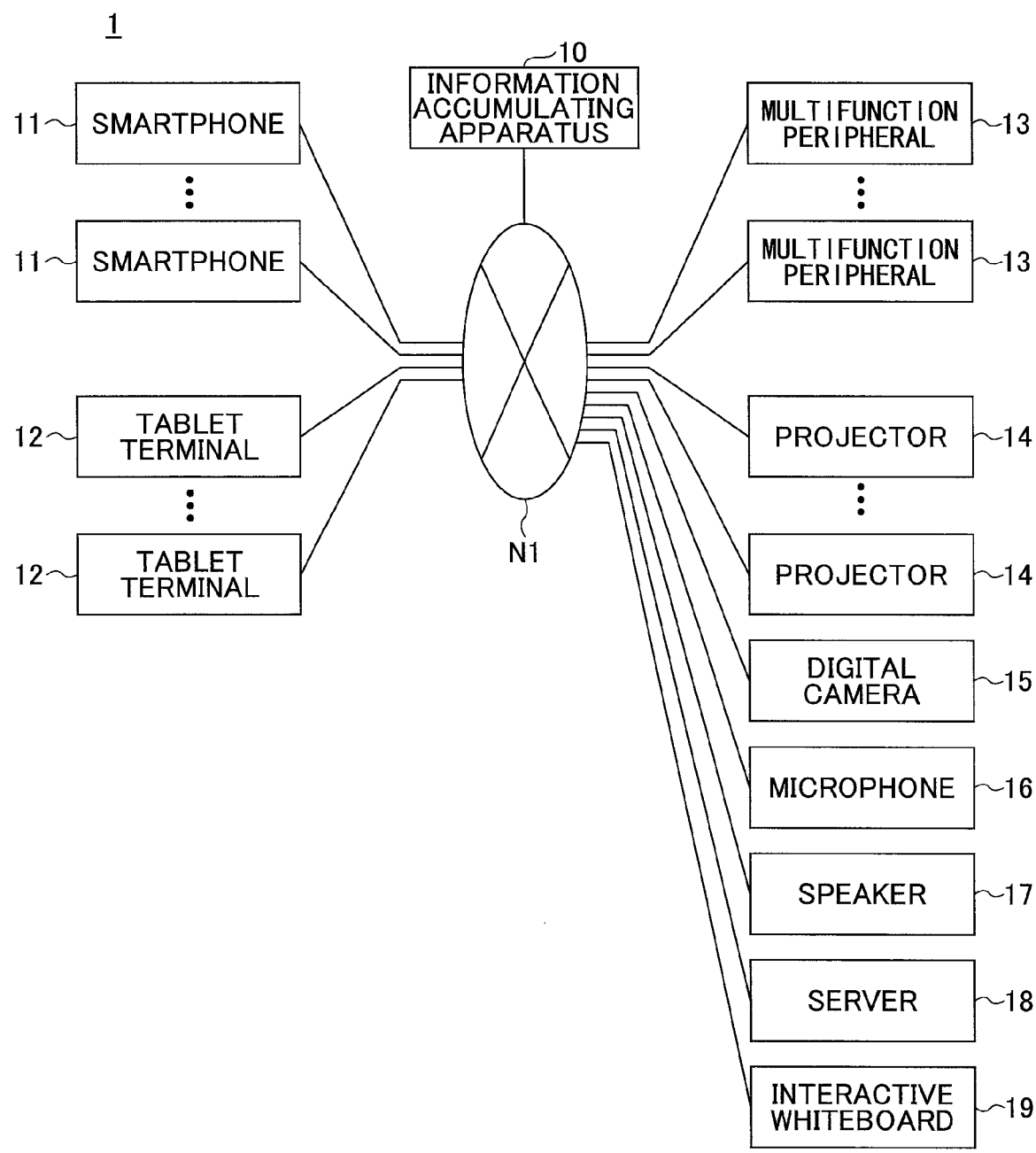
FIG. 1 illustrates an exemplary structure of a service providing system of an embodiment.

FIG. 1 illustrates an exemplary structure of a service providing system of a first embodiment. In a service providing system 1 illustrated in FIG. 1, an information accumulating apparatus 10 is connected to a network N1 such as a local area network (LAN). Further, in the service providing system 1, one or more smartphones 11 and one or more tablet terminals 12 are connected with a network N1. Further, in the service providing system 1, one or more multifunction peripherals (MFP) 13 and one or more projectors 14 are connected with the network N1 in the service providing system 1. Further, in the service providing system 1, a digital camera 15, a microphone 16, a speaker 17, a server 18, and an interactive whiteboard 19 are connected with the network N1.

The network N1 can be a network of a private environment such as an intranet. The smartphone 11 and the tablet terminal 12 are examples of devices carried (taken along) and operated by a user. The operation terminal may be a terminal apparatus operated by the user such as a mobile phone and a notebook PC in addition to the smartphone 11 and the tablet terminal 12.

The MFP 13 and the projector 14 are an example of the electronic apparatus which inputs and outputs electronic data such as print, scan, and projection. Further, a digital camera 15, a microphone 16, and a speaker 17 are an example of the electronic apparatus for inputting and outputting the electronic data. The electronic apparatus may be an apparatus for inputting and outputting electronic data such as a printer, a scanner, a copier, and an output device in addition to the MFP 13 and the projector 14.

The MFP 13 is an example of the image forming apparatus. The MFP 13 has an image capturing function, an image forming function, and a communication function and can be used as a printer, a facsimile, a scanner, and a copier. The MFP can print image data. The MFP 13 is an image reading apparatus which reads an original and generates an image data. Further, the MFP 13 has a web browsing function. The projector 14 is an exemplary image projection apparatus. The projector 14 has a projection function and the communication function. The projector 14 displays and outputs image data. The digital camera 15 is an exemplary image capturing apparatus. A microphone 16 and a speaker 17 are an exemplary audio input and output apparatus. A server 18 is an exemplary apparatus performing any kind of process. Further, an interactive whiteboard 19 is an exemplary apparatus which displays and outputs electronic data such as image data, document data, or the like, receives a write input from the user, and generates electronic data such as image data and document data.

The information accumulating apparatus 10 is an example of an information processing apparatus. The information accumulating apparatus 10 performs a highly functional process which cannot be performed by the MFP 13 and the projector 14 and performs a process as the file server. The information accumulating apparatus 10 cooperates with an operation terminal such as the smartphone 11 and the tablet terminal 12 and provides input and output of the electronic data by the electronic apparatus such as the MFP 13 and the projector 14. The information accumulating apparatus 10 can be distributed to multiple computers.

<Hardware Structure>

Figure 2:
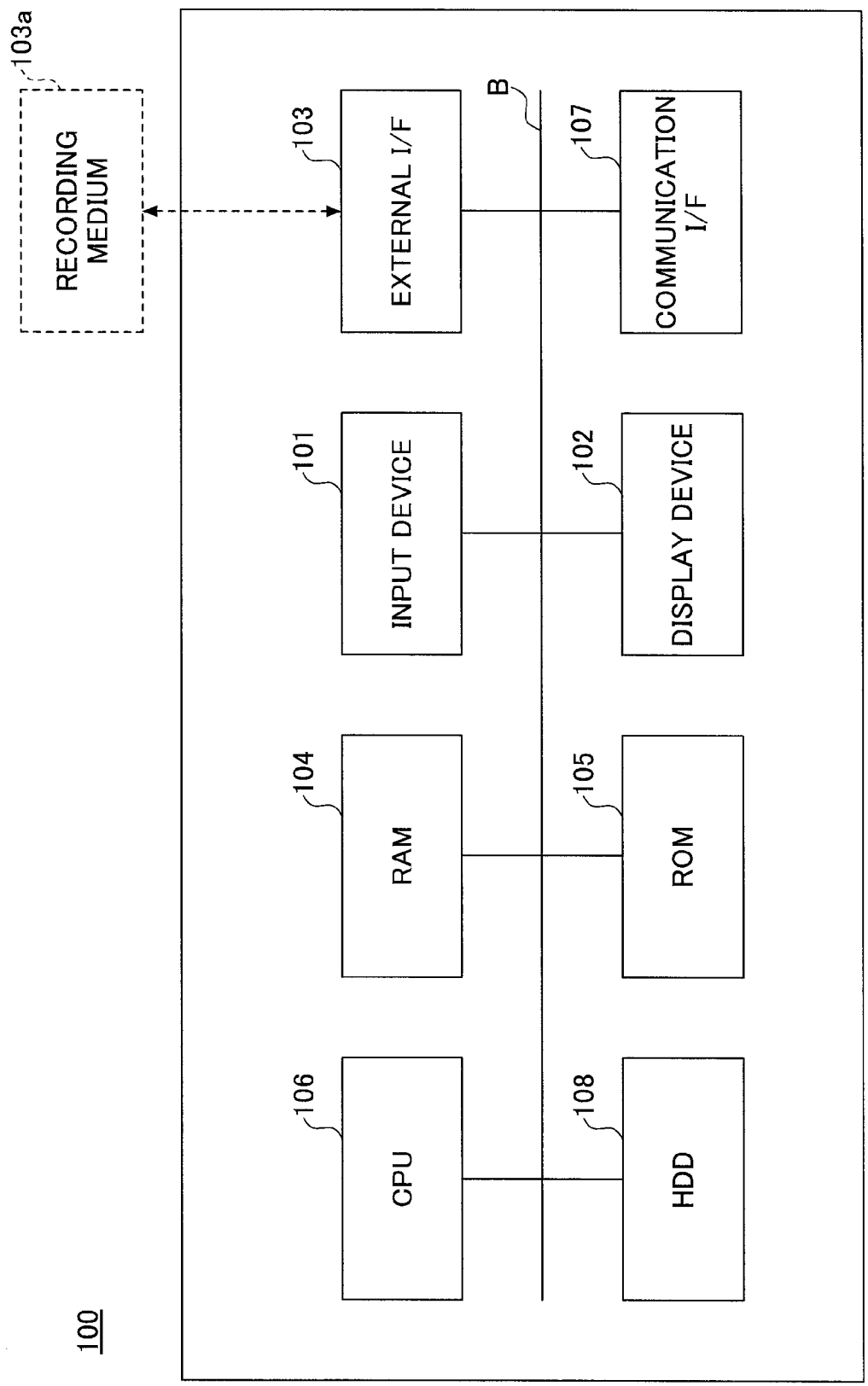
FIG. 2 illustrates an exemplary hardware structure of a computer system of the embodiment.

For example, the information accumulating apparatus 10 is substantialized by a computer system of a hardware structure illustrated in, for example, FIG. 2. FIG. 2 illustrates an exemplary hardware structure of the computer system of the first embodiment.

Referring to FIG. 2, the computer system 100 includes an input device 101, a display device 102, an external I/F 103, a RAM 104, a ROM 105, a CPU 106, a communication I/F 107, a HDD 108, and so on. In the computer system 100, the input device 101, the display device 102, the external I/F 103, the RAM 104, the ROM 105, the CPU 106, the communication I/F 107, and the HDD 108 are mutually connected by a bus B. The input device 101 may include a keyboard and a mouse, which are used to input various operation signals into the computer system 100.

The display device 102 includes a display or the like to display a processing result obtained by the computer system 100. The communication I/F 107 is an interface provided to connect the computer system 100 with the network N1. Thus, the computer system 100 can perform data communications with the operation terminal, the electronic apparatus, or the like through the communication I/F 107.

The HDD 108 is a non-volatile memory device that stores programs and data. The stored program and data are an operating system (OS), which is basic software controlling the entire computer system 100, an application program providing various functions in the OS, and so on. The HDD 108 administrates the stored program and data with a predetermined file system and/or a database (DB).

The external I/F 103 is an interface with an external apparatus. The external device is a recording medium 103a or the like. With this, the computer system 100 can read information from the recording medium 103a and/or write information to the recording medium 103a through the external I/F 103. The recording medium 103a includes a flexible disk, a CD, a Digital Versatile Disk (DVD), an SD memory card, a Universal Serial Bus (USB) memory, or the like.

The ROM 105 is a non-volatile semiconductor memory (memory device) which can hold program and/or data even when a power source is powered off. The ROM 105 stores programs and data used for a basic input/output system (BIOS), OS setup, network setup, or the like, which are executed at a time of booting up the computer system 100. The RAM 104 is a volatile semiconductor memory (memory device) temporarily storing a program and/or data.

The CPU 106 reads the program and/or data onto the RAM 104 from the memory device such as the ROM 105, the HDD 108, or the like. A process is performed by the read program or data to thereby entirely substantialize controls or functions of the computer system 100.

By combining the hardware resource, the program, and the data in the computer system 100 of the first embodiment, the hardware resource and the program collaborate to substantialize various processes described later.

Figure 3:
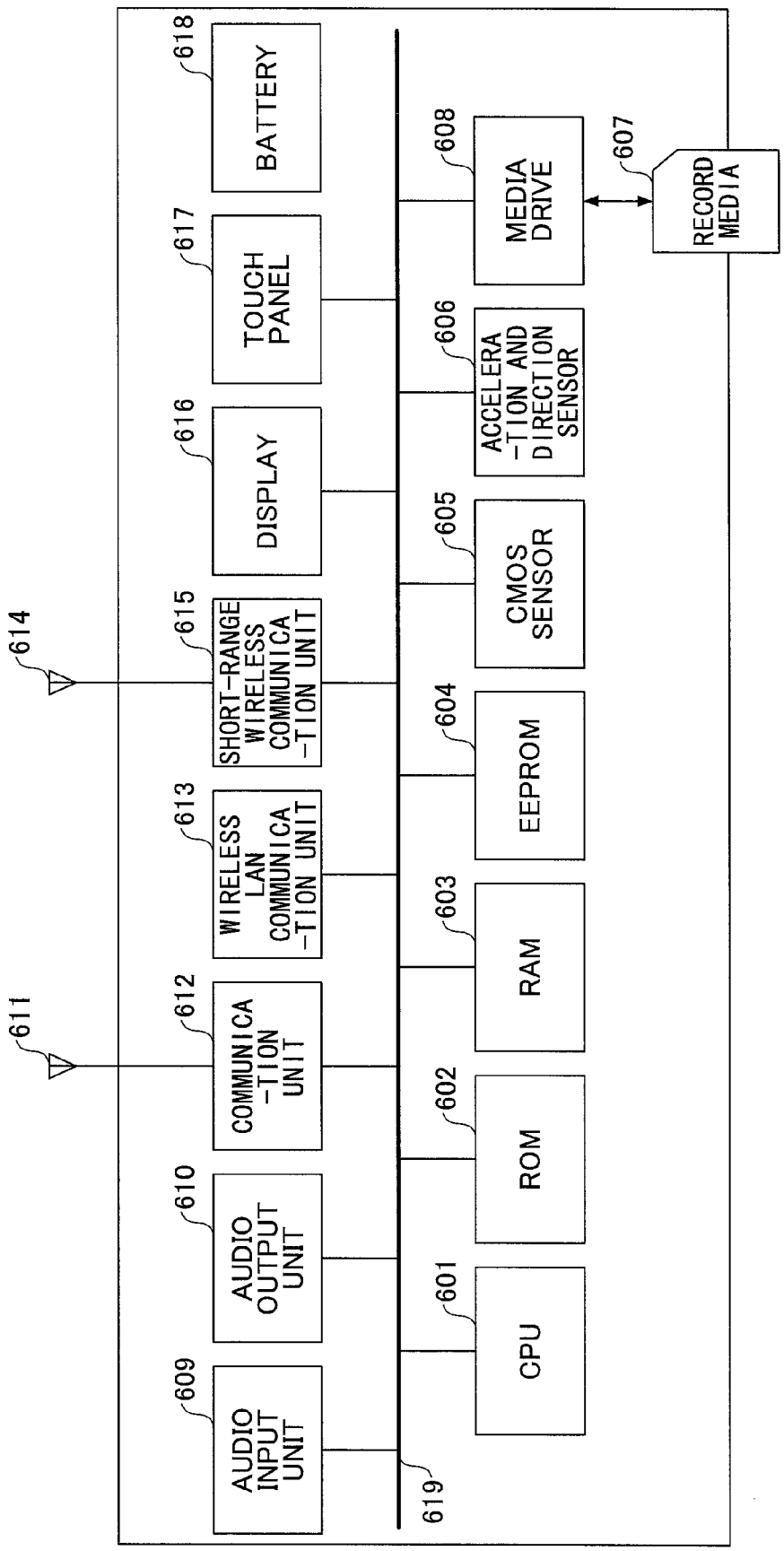
FIG. 3 illustrates an exemplary hardware structure of a computer of the embodiment.

The operation terminal such as the smartphone 11 and the tablet terminal 12 is substantialized by a hardware structure illustrated in, for example, FIG. 3. FIG. 3 illustrates an exemplary hardware structure of the operation terminal of the embodiment. The operation terminal illustrated in FIG. 3 includes a CPU 601, a ROM 602, a RAM 603, an EEPROM 604, a CMOS sensor 605, an acceleration and direction sensor 606, and a media drive 608.

The CPU 601 controls the entire operation of the operation terminal. The ROM 602 stores a basic input and output program. The RAM 603 is used as a work area of the CPU 601. The EEPROM 604 reads or writes data in conformity with a control of the CPU 601. The CMOS sensor 605 captures an object in conformity with a control of the CPU 601 to acquire image data. An acceleration and direction sensor 606 is an electromagnetic compass that detects earth magnetism, a gyrocompass, an acceleration sensor, or the like.

The media drive 608 controls read or write (store) of data from or to a record media 607 such as a flash memory. Data already recorded in the record media 607 are read out or new data are written in the record media 607. The record media 607 is freely attachable or detachable with respect to the media drive 608.

The EEPROM 604 stores an operating system (OS) executed by the CPU 601, association information necessary for a network setup, or the like. An application for performing various processes in the first embodiment is stored in the EEPROM 604, the record media 607, or the like.

The CMOS sensor 605 is a charge-coupled device that converts light to electric charges and digitizes the image of an object. The CMOS sensor may be substituted by, for example, a charge coupled device (CCD) as long as the image of the object can be captured.

Further, the operation terminal includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts an audio to an audio signal. The audio output unit 610 converts an audio signal to an audio. The communication unit 612 uses the antenna 611 to communicate with the nearest base station apparatus by a wireless communication signal. A wireless LAN communication unit 613 performs a wireless LAN communication with an access point in conformity with the standard IEEE 80411. The short-range wireless communication unit 615 performs short-range wireless communication (Bluetooth, "Bluetooth" is a registered trademark) using a short-range wireless communication antenna 614.

The display 616 is provided to display an image of an object, various icons, or the like. The display 616 is a liquid crystal or an organic EL. The touch panel 617 is mounted on the display 616 and is formed of a panel of a pressure sensitive type or a static type. A touch position on the display 616 is detected by a touch of a finger or a touch pen. The bus line 619 is an address bus, a data bus, or the like for electrically connecting the above various portions.

The operation terminal includes a battery 618 for a dedicated use. The operation terminal is driven by the battery 618. The audio input unit 609 includes a microphone for inputting an audio. The audio output unit 610 includes a speaker for outputting an audio.

As described, the operation terminal of the embodiment can substantialize various processes described later with the hardware structure.

<Software Structure>

《Information Accumulating Apparatus 10》

Figure 4:
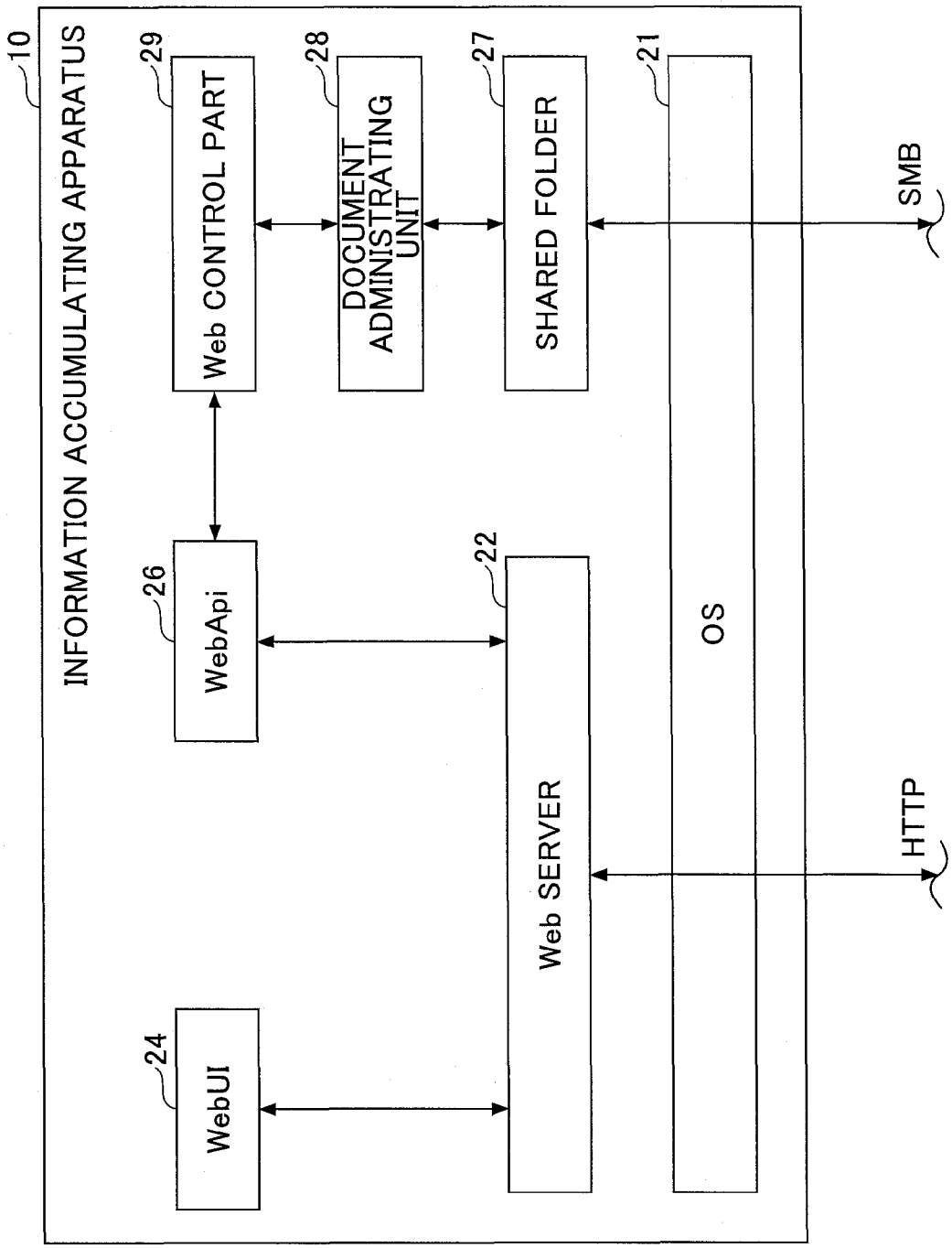
FIG. 4 is an exemplary processing block chart of an information accumulating apparatus of the embodiment.

The information accumulating apparatus 10 of the first embodiment is substantialized by the processing block illustrated in, for example, FIG. 4. FIG. 4 is an exemplary processing block chart of the information accumulating apparatus of the first embodiment. The information accumulating apparatus 10 executes the program to substantialize an OS 21, a web server 22, a Web UI 24, a WebApi 26, a shared folder 27, a document administrating unit 28, and a web control part 29.

The OS 21 is an operating system of the information accumulating apparatus 10. The OS controls the entire system.

The OS 21 is, for example, Windows ("Windows" is a registered trademark) or Linux ("Linux" is a registered trademark).

The web server 22 is software of sending and receiving information using Hyper Text Transfer Protocol (HTTP). The web server 22 is, for example, Apache Tomcat ("Apache Tomcat" is a registered trademark) or IIS ("IIS" is a registered trademark).

The WebUI 24 causes a screen such as the system setup screen to be displayed on the operation terminal by an HTTP request. The user may use a web browser (not illustrated) to change setup using, for example, a setup screen.

The WebApi 26 is an application programming interface and can be used through the network N1. The WebApi 26 receives an HTTP request, performs a process corresponding to the HTTP request, and performs a HTTP response.

The WebApi 26 is an interface previously determined to receive a request from the smartphone 11 and a tablet terminal 12. The WebApi 26 is formed by, for example, a function or a class.

Further, the WebApi 26 of the information accumulating apparatus 10 can be provided as a software development kit (SDK) to a developer of an application installed in an operation terminal. The developer of the application can develop the applications using the SDK. The SDK can be serviced to a third vendor other than a person who servicing the information accumulating apparatus 10. The third vendor can develop the application using the serviced SDK. The application developed using the SDK can be installed in the operation terminal.

By servicing the WebApi of the information accumulating apparatus 10 as the SDK, not only an application developed by a person who services the information accumulating apparatus 10 but also an applications developed by the third vendor can be installed in the information accumulating apparatus 10.

The shared folder 27 is a folder publicly opened on the network N1 by a server message block (SMB) protocol. The user uses the operation terminal such as the smartphone 11 or the tablet terminal 12 to access the shared folder 27.

The document administrating unit 28 administrates a file in the shared folder 27 and performs a process of converting data in response to the request from the web control part 29. The file in the first embodiment is one mode of the electronic data. The web control part 29 performs a process of controlling the document administrating unit 28 in response to a request from the WebApi 26.

The information accumulating apparatus 10 can cause the process (the workflow) to be performed by a cooperation of various input and output apparatuses (the electronic apparatuses) illustrated in FIG. 1 through the above-described SMB protocol or WebApi.

For example, the workflow is "scan to projector" where a scan command is sent to the MFP 13, and the information accumulating apparatus 10 receives the scanned data and causes the scanned data to be projected by the projector 14. The method of sending the scan command may be a method similar to an ordinary pull scan or a method by the MFP 13 of polling to know whether a command to the information accumulating apparatus 10 exists.

The information accumulating apparatus 10 stores a workflow database as illustrated in FIG. 21 in the HDD 108 (or the ROM 105 or the RAM 104). FIG. 21 illustrates an exemplary structure of the workflow database.

The workflow database illustrated in FIG. 21 is a table administrating a workflow as described above. In the workflow database illustrated in FIG. 21, workflow identification information, a workflow name, and an apparatus to be used are stored by collaborating these. The workflow identification information is information for identifying the workflow. The workflow name is the name of the workflow. The workflow name may be any. However, as illustrated in FIG. 21, the workflow name may be set so that the user can easily identify a process performed by the workflow. The apparatus to be used designates a type of an apparatus used by the workflow.

For example, when the apparatus to be used is "(scanner-MFP)-(printer-MFP)", the scanner or the MFP is used as an input apparatus and the printer or the MFP is used as the output apparatus. The workflow database may be of any type as long as an apparatus used for the workflow is stored by associating the workflow database with the apparatus used for the workflow.

The workflow database can use the information of the apparatus to be used when the smartphone determines the apparatus used for the workflow as described below by previously associating the workflow database with information indicative of the type of the apparatus as illustrated in FIG. 21.

The information accumulating apparatus 10 stores a setup item of the apparatus as illustrated in FIG. 22 in the HDD 108 (or the ROM 105 or the RAM 104). FIG. 22 illustrates an exemplary structure of a table of setup items for each apparatus.

A table including the setup item illustrated in FIG. 22 stores the setup item necessary in performing processes for each apparatus used for the above workflow with each apparatus. The setup item may be in common to all processes like the projector, or may differ for each process like the input process and the output process of the MFP.

By using FIGS. 21 and 22, the smartphone 11 described later can determine the setup item necessary for the workflow. For example, in a case where the workflow is "scan to projector", the input process is "the scanner or the MFP", and the setup item is "data format/aggregation/color/whether data are held after scan/whether there is instruction of user". Further, the output process is "the projector", and the setup item is "projection instruction/setup of terminal for instruction".

As described, the information necessary to perform the workflow is information respectively determining "the scanner or the MFP" and "the projector" (e.g., an IP address or apparatus identification information) and information of the setup item ("data format/aggregation/color/whether data are held after scan/whether there is instruction of user" of the input process and "projection instruction/setup of terminal for instruction" of the output process).

Figure 23:
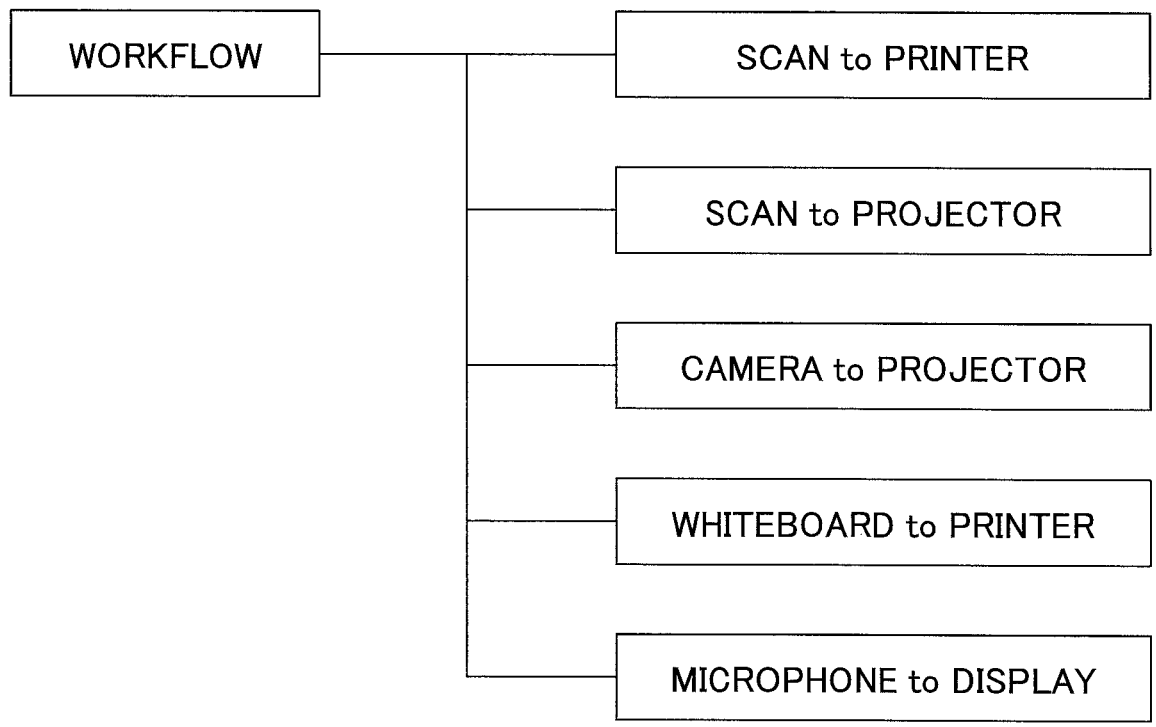
FIG. 23 is an image chart of an exemplary workflow managed by a folder form.

Further, it is possible to administer the workflow in the folder form as illustrated in FIG. 23 in the information accumulating apparatus 10. FIG. 23 is an image chart of an exemplary workflow managed by the folder form. In this case, the information accumulating apparatus 10 may perform the workflow after detecting, for example, a store of the electronic data (e.g., a file or the like in which the information necessary to perform the above workflow) into the folder 10. Further, in a case where such a folder form is used for the administration, information for determining the folder such as the folder pass may be stored by the information for the association illustrated in FIG. 21.

In the information accumulating apparatus 10, two prominent processes are operated. One process of the two processes includes the web server 22, the WebUI 24, and the WebApi 26. The other process of the two processes includes the shared folder 27, the document administrating unit 28, and the web control part 29. Therefore, the WebApi 26 and the web control part 29 perform inter-process communication.

《Operation Terminal》

Figure 5:
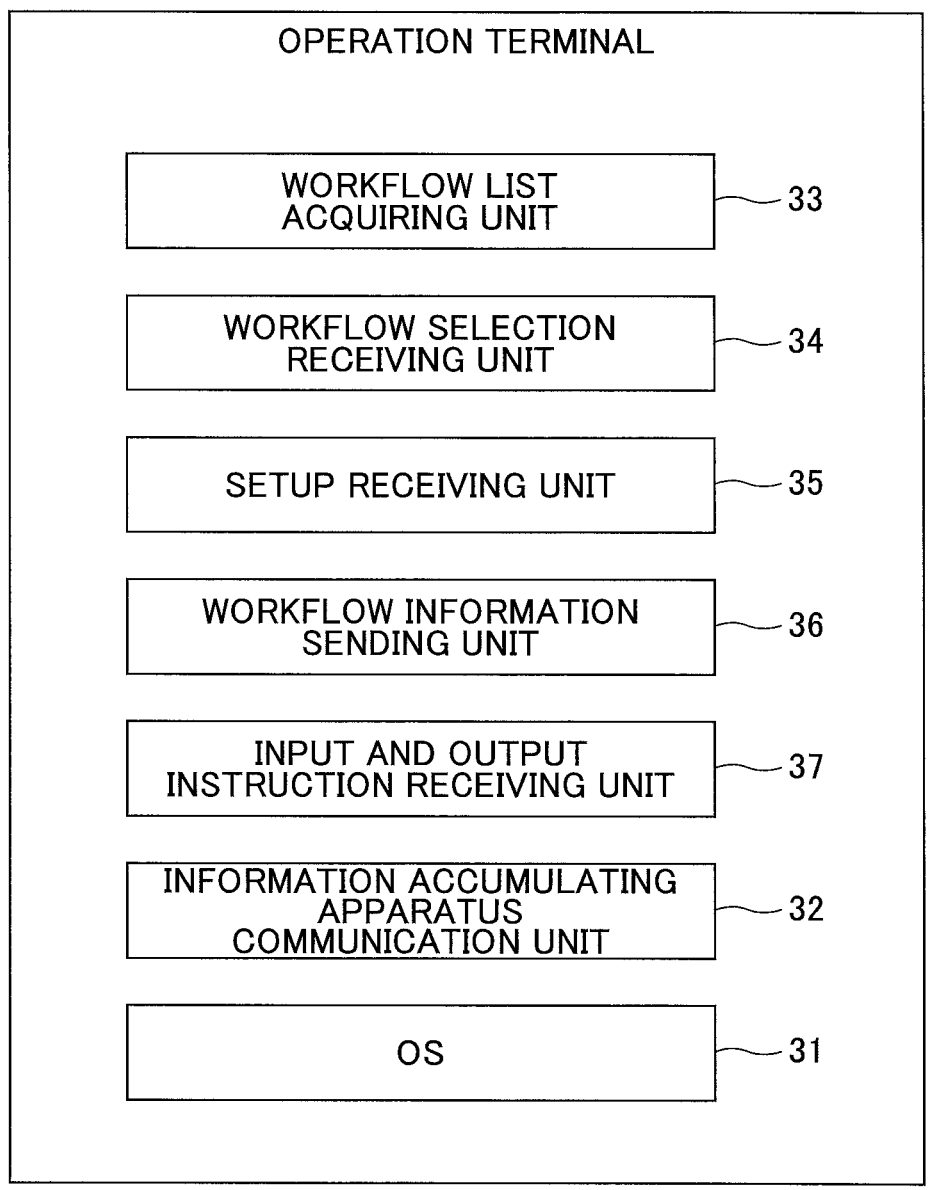
FIG. 5 is an exemplary processing block chart of an operation terminal of the embodiment.

The operation terminal of the first embodiment is substantialized by the processing block illustrated in, for example, FIG. 5. FIG. 5 is an exemplary processing block chart in the operation terminal of the first embodiment. The operation terminal substantializes an OS 31, an information accumulating apparatus communication unit 32, a workflow list acquiring unit 33, a workflow selection receiving unit 34, a setup receiving unit 35, a workflow information sending unit 36, and an input and output instruction receiving unit 37 by executing a program.

The OS 31 is an operating system of the operation terminal. The OS such as iOS ("iOS" is a registered trademark) or Android ("Android" is a registered trademark) controls the entire system.

The information accumulating apparatus communication unit 32 sends and receives information to and from the WebApi 26 of the information accumulating apparatus 10 using HTTP. Further, the information accumulating apparatus communication unit 32 can access the shared folder 27 of the information accumulating apparatus 10 using SMB. The operation terminal uses the information accumulating apparatus communication unit 32 to acquire electronic data or information from the information accumulating apparatus 10 or to request a process to the information accumulating apparatus 10.

The workflow list acquiring unit 33 uses the information accumulating apparatus communication unit 32 to acquire the workflow list from the information accumulating apparatus 10. The workflow selection receiving unit 34 displays the workflow list and receives a selection of the workflow from the user. The setup receiving unit 35 receives a setup of an input electronic apparatus (an input apparatus) and a setup of an output electronic apparatus (an output apparatus) from the user. The setup receiving unit 35 has a function of reading a QR code ("QR code" is a registered trademark). The QR code is exemplary code information and is a matrix-type two-dimensional code. The QR code read by the setup receiving unit 35 is a QR code for connecting the operation terminal to the information accumulating apparatus 10 and a QR code for determining the electronic apparatus such as the MFP 13.

The workflow information sending unit 36 sends input and output apparatus information set by the user to the information accumulating apparatus 10 as workflow information. The workflow information sending unit 36 sends the workflow information to the information accumulating apparatus by using the information accumulating apparatus communication unit 32. In a case where an input and output instruction by the user is necessary, the input and output instruction receiving unit 37 receives the input and output instruction from the user and reports the input and output instruction to the information accumulating apparatus 10.

The input apparatus can be selected from the MFP 13 having the scan function, the digital camera 15, the server 18 storing data, or the like. The output apparatus can be selected from the MFP 13 having the print function, the projector 14, or the like.

<Detailed Process>

Hereinafter, a detailed process of the service providing system 1 of the first embodiment is described.

《Scan to Projector》

Herein below, described is a process in a case where "scan to projector" is selected by the user from the workflow list of the information accumulating apparatus 10 through the smartphone 11. The user sets the input and output apparatus necessary for performing the workflow and the input and output condition using the smartphone 11 to cause the information accumulating apparatus 10 to perform the workflow of "scan to projector".

Figure 6:
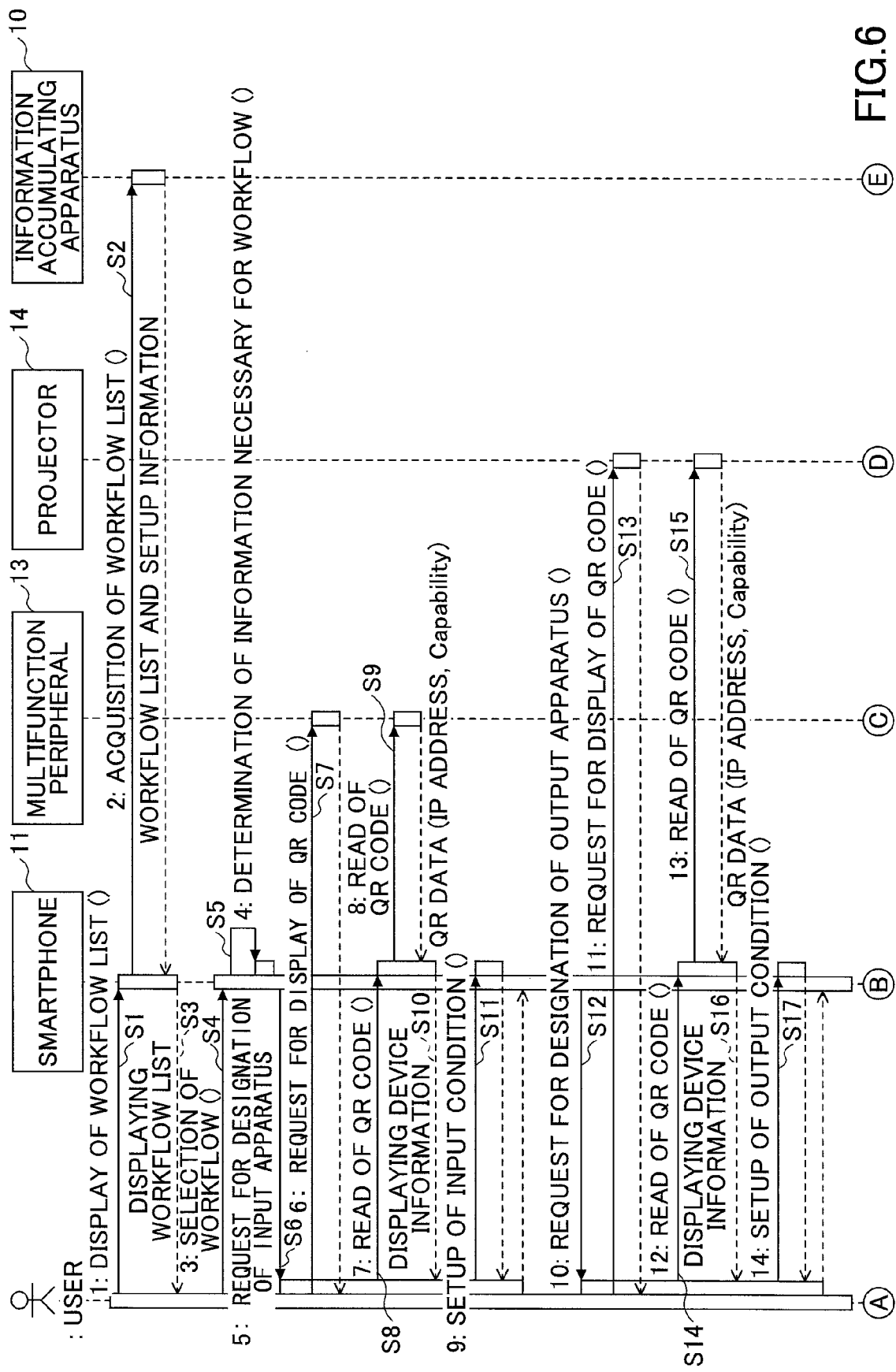
FIG. 6 is an exemplary sequence chart (1/2) of a service providing system of the embodiment.
Figure 7:
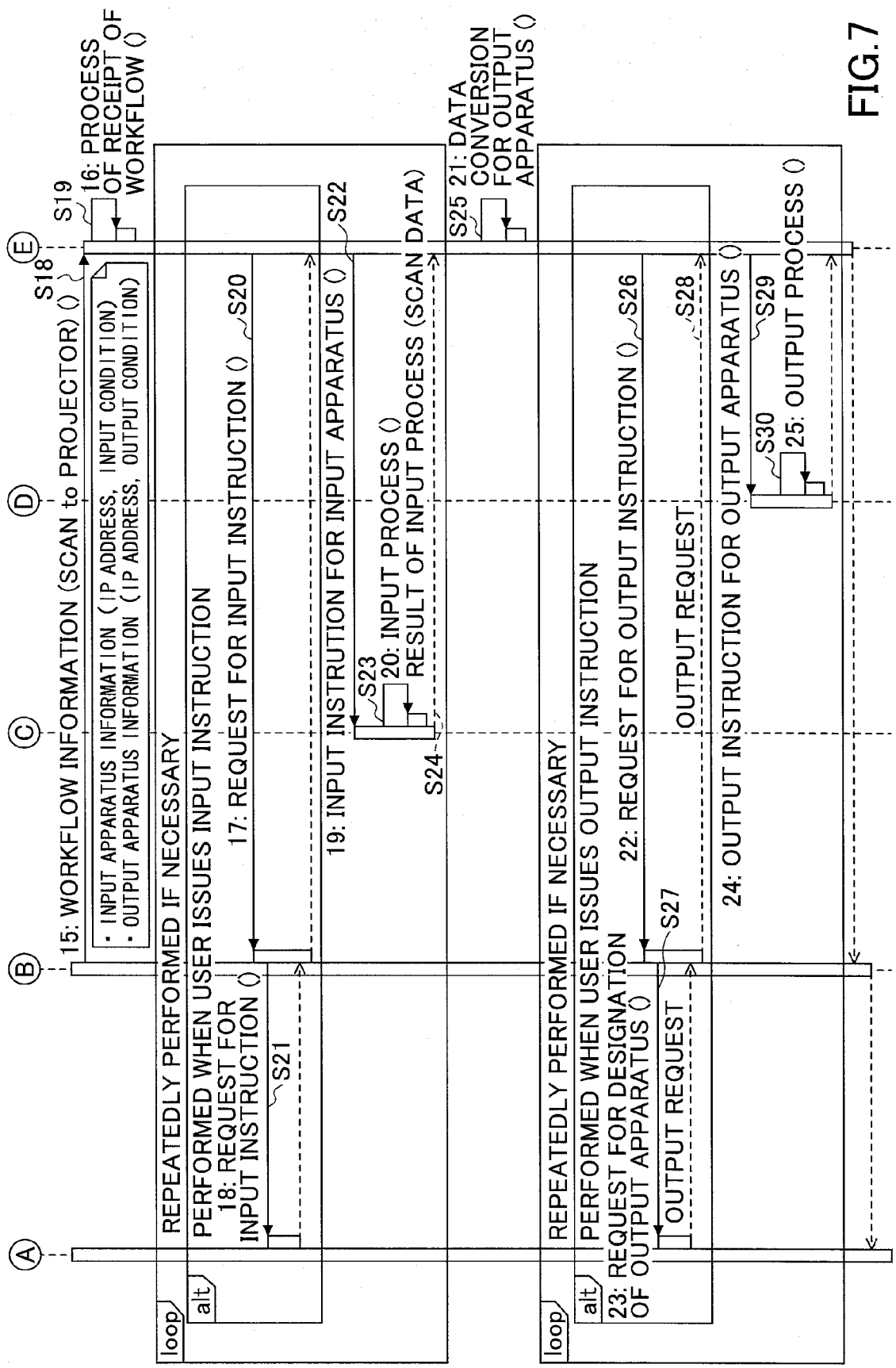
FIG. 7 is an exemplary sequence chart (2/2) of the service providing system of the embodiment.

FIGS. 6 and 7 are exemplary sequence charts of the service providing system of the embodiment. The sequence charts of FIGS. 6-7 illustrate a case where the MFP 13 scans and the scan data are projected by the projector 14.

In step S1, the user requests the smartphone 11 to display the workflow list. The smartphone 11 is requested by the user to display the workflow list. In step S2, the smartphone 11 accesses the information accumulating apparatus 10 to receive the workflow list, which can be performed, and items of the setup information necessary to perform the workflow. Here, the smartphone 11 receives information illustrated in FIGS. 21 and 22 and stored in the information accumulating apparatus.

In step S3, the smartphone 11 displays the received workflow list to the user. In step S4, the user selects one workflow from the workflow list displayed by the smartphone 11 and requests to performance of the selected one workflow. In step S5, the smartphone 11 requested by the user to perform the workflow determines the setup information necessary to perform the workflow.

In step S2, the smartphone 11 accesses the information accumulating apparatus 10 and receives items of the setup information necessary to perform the workflow. However, the embodiment is not limited to this, it is possible to acquire only the workflow list in step S2, and the smartphone 11 may access the information accumulating apparatus 10 in step S5 and receive items of the setup information necessary to perform the workflow selected in step S4.

In step S6, the smartphone 11 requests the user of designation of the input apparatus and setup of the input condition in the setup information necessary for performing the workflow. The user designates the MFP 13 as the input apparatus. Therefore, the user requests a display (an operation of display) of a QR code to the MFP 13 in step S7. The MFP 13 requested to display the QR code displays the QR code on, for example, the operation panel. The QR code to be used may be that printed on a paper or the like and attached to the casing. The QR code includes the apparatus information of determining the electronic apparatus such as the IP address of the MFP 13 and capability information of determining the capability of the MFP 13. The smartphone 11 may acquire the apparatus information or the capability information by a short-range wireless communication such as an infrared communication, a sound wave, a NFC, or the like in place of or in addition to the capture of the QR code.

The capability information of the electronic apparatus indicates a process which can be executed in the electronic apparatus whether the print is possible, whether the projection is possible, or whether the scan is possible. In step S8, the user operates the smartphone 11 and requests the read of the QR code.

When the smartphone 11 is requested to read the QR code by the user, the smartphone 11 captures the QR code by the camera function and reads the QR code. The smartphone 11 acquires the IP address of the MFP 13 and the capability information from the QR code. The IP address also plays a role of connection information for connecting with the electronic apparatus.

In step S10, the smartphone 11 displays the IP address and the capability information of the MFP 13 acquired from the QR code as device information. In step S11, the user sets the input condition. The user sets the input condition of the smartphone 11. After steps S6 to S11, the setup of the input apparatus information ends.

In a case where the performable process indicated by the acquired capability information cannot be used for the workflow, namely the acquired capability information indicates that only the projection is possible when the input device of, for example, "scan to projector" is determined, the smartphone 11 displays on its display that a workflow is not performed by the electronic apparatus which has acquired the capability information. Subsequently, the user starts setting the apparatus information. In step S12, the smartphone 11 requests the user of designation of the output apparatus and setup of the output condition in the setup information necessary for performing the workflow.

The user requests a display (an operation of display) of the QR code to the projector 14 in step S13 in order to designate the projector 14 as the output apparatus. The projector 14 requested to display the QR code displays the QR code on, for example, the operation panel or projects the QR code onto the screen or the like. The QR code to be used may be that printed on a paper or the like and attached to the casing. The QR code includes the apparatus information of determining the electronic apparatus such as the IP address of the MFP 14 and capability information of determining the capability of the projector 14. In step S14, the user operates the smartphone 11 and requests the read of the QR code.

When the smartphone 11 is requested to read the QR code by the user, the smartphone 11 captures the QR code by the camera function and reads the QR code in step S15. The smartphone 11 acquires the IP address of the projector 14 and the capability information from the QR code.

In step S16, the smartphone 11 displays the IP address and the capability information of the projector 14 acquired from the QR code as device information. In step S17, the user sets the output condition. The user sets the output condition of the smartphone 11. After steps S12 to S17, the setup of the output apparatus information ends.

In step S18, the smartphone 11 sends the input apparatus information and the output apparatus information, which are set by the user, to the information accumulating apparatus 10 as workflow information. The input apparatus information includes the IP address of the MFP 13 and the input condition. The output apparatus information includes the IP address of the projector 14 and the output condition. Further, in a case where the workflow is administered by the folder illustrated in FIG. 23, the smartphone 11 may store the input apparatus information and the output apparatus information in a folder corresponding to the selected "scan to projector" through the WebApi 26.

In step S19, the information accumulating apparatus 10 receives workflow information received from the smartphone 11 as a request of performing the workflow. The information accumulating apparatus 10 reads the IP address of the input and output apparatus and the output condition from the received workflow information. Although not illustrated, when the information necessary for the performance of the workflow (the above input and output apparatus information) is insufficient, the information accumulating apparatus 10 sends an existence of an error to the smartphone.

The smartphone 11 displays that the error occurs to report the error to the user. The insufficiency of the information necessary for the performance of the workflow occurs in a case where, when the workflow of, for example, "scan to projector" is selected, the information of camera is sent as the input apparatus information or the input condition or the output condition is not set.

The processes of steps S20 and S21 are performed in a case where the input instruction of the user is necessary. The information accumulating apparatus 10 requests the user to input an instruction through the smartphone 11. A case where the input instruction is necessary is setting or the like of a paper original to the MFP 13. The case where the input instruction is necessary is set by the user as, for example, a part of the input condition of the workflow.

In step S22, the information accumulating apparatus 10 performs the input instruction in conformity with the input condition to the MFP 13 designated as the input apparatus of the workflow. When the input instruction is received from the information accumulating apparatus 10, the MFP 13 performs the input process in conformity with the input condition in step S23. After the input process ends, the MFP 13 sends the scan data acquired in step S24 to the information accumulating apparatus 10 as the input process result. The cooperation between the information accumulating apparatus 10 and the MFP 13 illustrated in steps S20 to S24 is repeatedly performed as necessary.

In step S25, the information accumulating apparatus 10 converts the scan data received from the MFP 13 to a file format corresponding to the projector 14. In a case where the output apparatus is the projector 14, the information accumulating apparatus 10 mainly converts the scan data to an image format (e.g., a information received from the smartphone 11 as a request of performing the workflow. The information accumulating apparatus 10 can per The processes of steps S26 and S27 are performed in a case where the output instruction of the user is necessary. The information accumulating apparatus 10 requests the user to output an instruction through the smartphone 11. A case where the output instruction is necessary is a case where the projection data are output by the user to the projector at an appropriate timing. The case where the input instruction is necessary is set by the user as, for example, a part of the output condition of the workflow.

In step S24, the information accumulating apparatus 10 performs the output instruction in conformity with the output condition to the projector 14 designated as the output apparatus of the workflow. When the output instruction is received from the information accumulating apparatus 10, the projector 14 performs the output process in conformity with the output condition in step S30. The cooperation between the information accumulating apparatus 10 and the MFP 14 illustrated in steps S26 to S30 is repeatedly performed as necessary.

Figure 8:
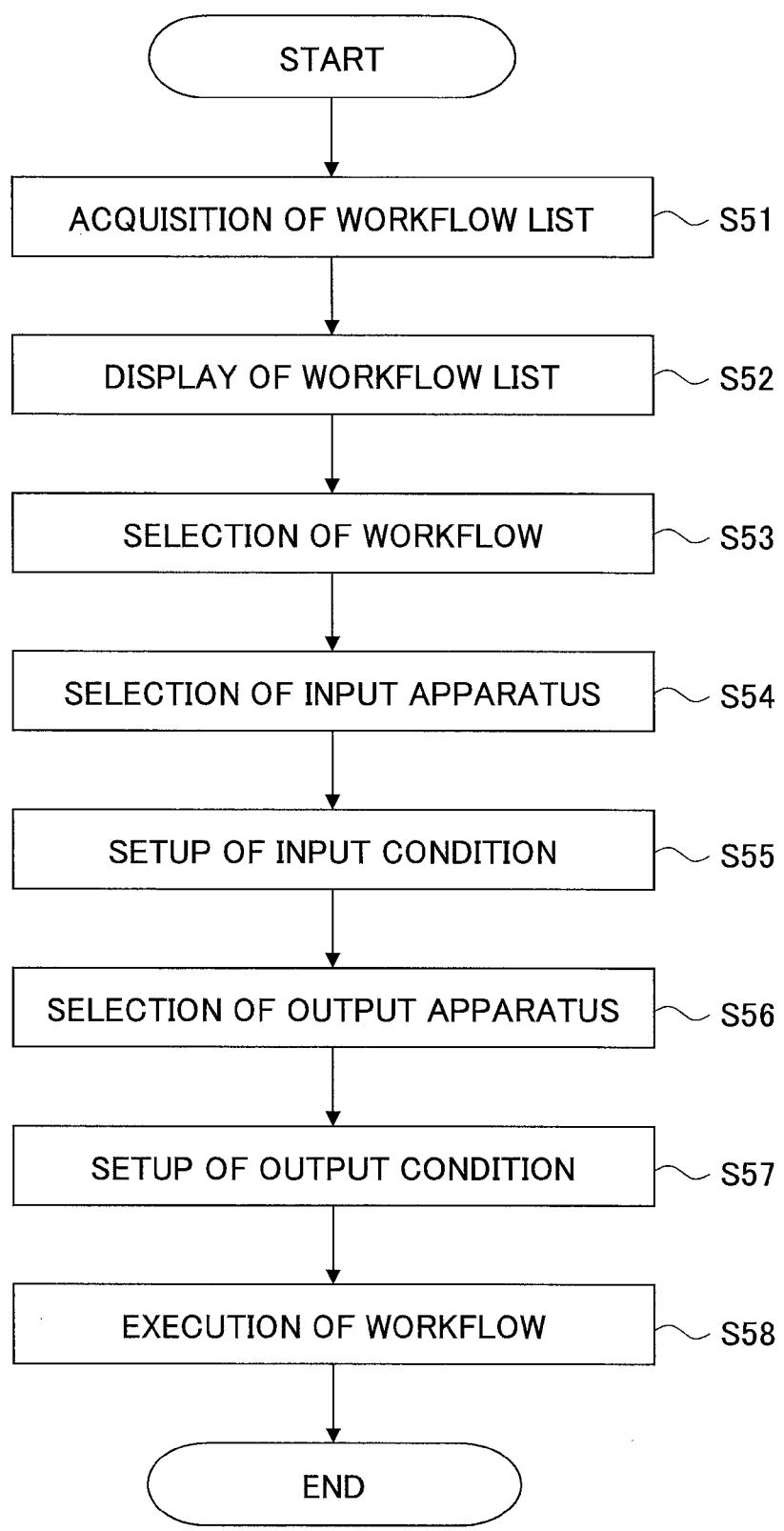
FIG. 8 illustrates an exemplary flow chart of an operation terminal of the embodiment.

FIG. 8 illustrates an exemplary flow chart of an operation terminal of the first embodiment; Here, the smartphone 11 as an exemplary operation terminal is exemplified.

Figure 9:
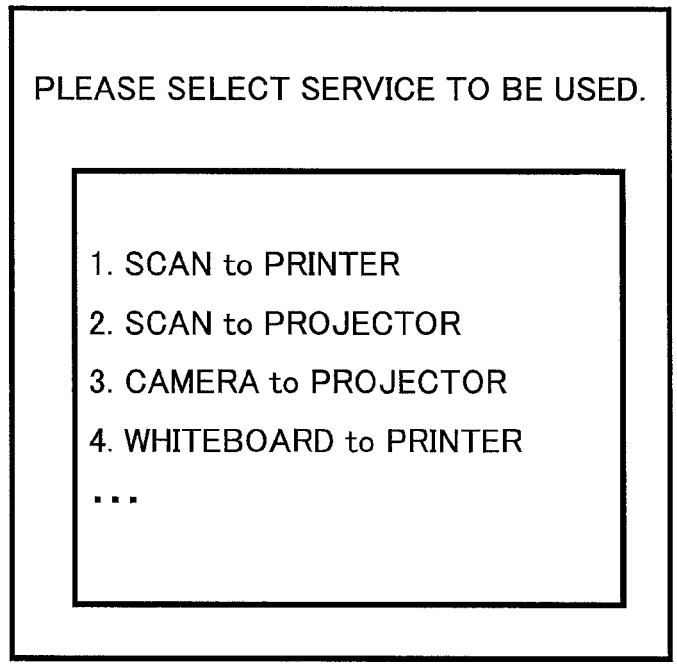
FIG. 9 is an image chart of an exemplary workflow list screen.

In step S51, the smartphone 11 is requested by the user to display the workflow list. In step S52, the smartphone 11 accesses the information accumulating apparatus 10 to receive the workflow list, which can be performed, and items of the setup information necessary to perform the workflow. The smartphone 11 displays a workflow list screen illustrated by, for example, FIG. 9. FIG. 9 is an image chart of the exemplary workflow list screen.

In step S53, one workflow, which is desired to be performed by the user, is selected from the workflow list screen illustrated in FIG. 9. The smartphone 11, in which the workflow is selected, displays a selection screen of the input apparatus necessary for performing the workflow.

Figure 10:
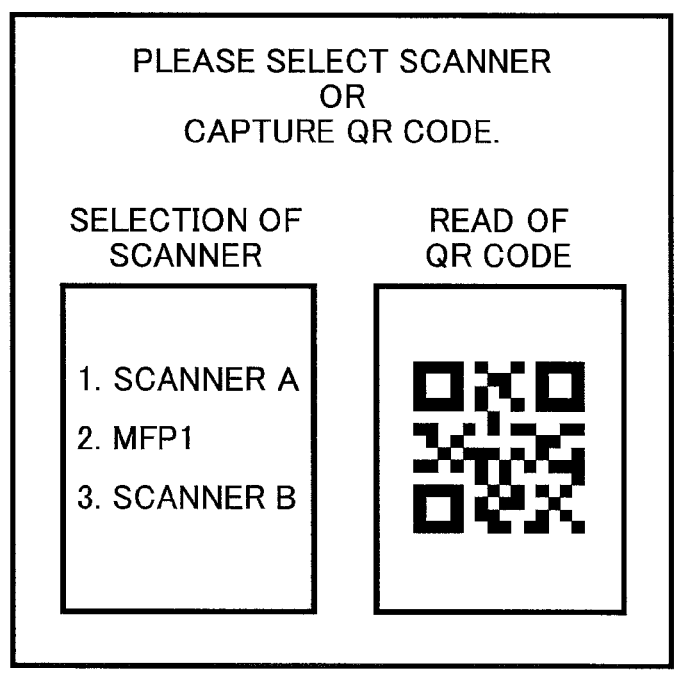
FIG. 10 is an image chart of an exemplary selection screen for selecting an input apparatus.

FIG. 10 is an image chart of an exemplary selection screen of the input apparatus. In step S54, the smartphone 11 receives a selection of the input apparatus by the user from the selection screen of the input apparatus. As illustrated in FIG. 10, the input apparatus may be selected by the user from an apparatus list displayed on the selection screen of the input apparatus or may be selected by the user by reading a QR code from the input apparatus.

Figure 11:
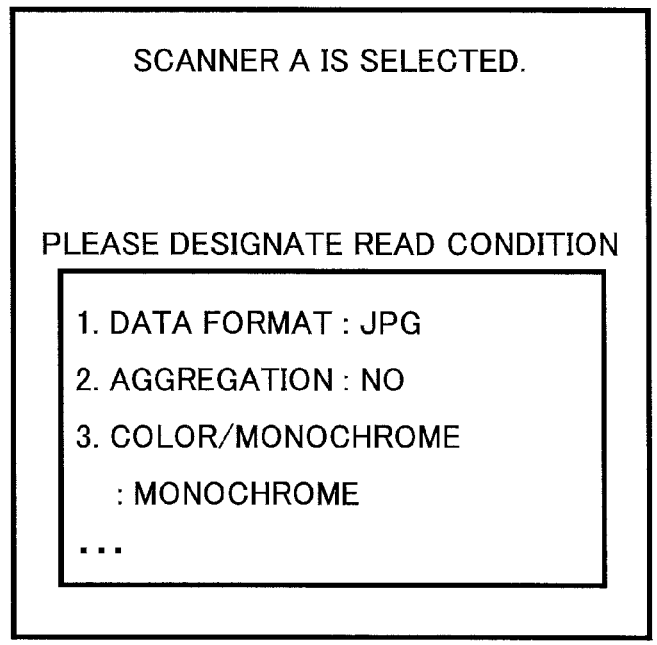
FIG. 11 is an image chart of a setup screen for setting up an input condition.

In step S55, the smartphone 11 displays an input condition setup screen, which is provided to set an input condition of the input apparatus selected by the user as illustrated in FIG. 11. FIG. 11 is an image chart of a setup screen for setting up an input condition. The smartphone 11 receives a setup of the input condition from the setup screen of the input condition. Referring to FIG. 11, a setup of read condition is received as an exemplary input condition.

The setup condition of the scan is a setup of a data format of the scanned image data, a setup of aggregation and color/monochrome at the time of scanning an image, whether data are held after performing the workflow, a setup of a place where the data are held, a setup whether the input process is performed in response to the instruction by the user or the input process is automatically performed, or the like.

Figure 12:
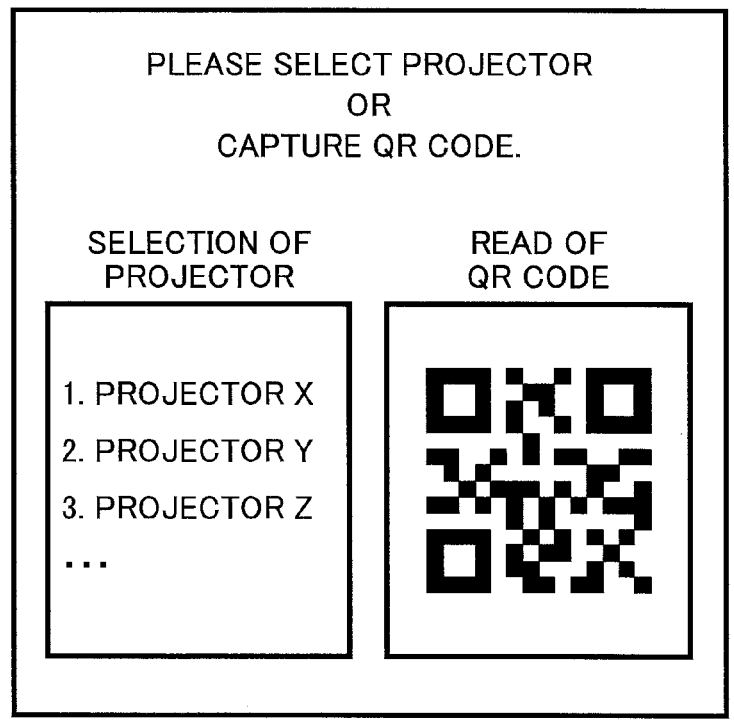
FIG. 12 is an image chart of an exemplary selection screen for selecting an output apparatus.

Subsequently, the smartphone 11 displays the selection screen of the output apparatus necessary for performing the workflow. FIG. 12 is an image chart of an exemplary selection screen of the output apparatus. In step S56, the smartphone 11 receives a selection of the input apparatus by the user from the selection screen of the output apparatus. As illustrated in FIG. 12, the output apparatus may be selected by the user from an apparatus list displayed on the selection screen of the output apparatus or may be selected by the user by reading a QR code from the output apparatus.

In step S57, the smartphone 11 displays an output condition setup screen, which is provided to set an output condition of the output apparatus selected by the user as illustrated in FIG. 13. FIG. 13 illustrates an exemplary image of a setup screen for setting up the output condition. The smartphone 11 receives a setup of the output condition from the setup screen of the output condition. Referring to FIG. 13, a setup of the projection condition is received as an exemplary output condition.

The setup condition of the projection is a setup of whether the user instructs a projection (a start and a stop of the projection, page feeding, or the like) of the scanned image in response to an input by the user or in an automatic manner (the instruction of the projection is performed at a predetermined time), a setup of a terminal, (a current smartphone or a smartphone of the other person (a presenter or the like), with which the instruction of the projection (the start and the stop of the projection, page feeding, or the like), or the like.

In step S58, the smartphone 11 sends the input apparatus information and the output apparatus information, which are set by the user, to the information accumulating apparatus 10 as the workflow information. The information accumulating apparatus 10 receives workflow information received from the smartphone 11 as a request of performing the workflow. The information accumulating apparatus 10 can perform the workflow by controlling the input and output apparatus selected by the user based on the received workflow information.

Referring to FIG. 7, a detailed performance of the workflow on or after step S19 is described. The workflow is set up as follows. In step S4 of FIG. 6, "scan to projection" is selected. In step S11, the scan condition is set as "data format: jpg; aggregation: no; color/monochrome: monochrome; whether data are held after scan: yes; a place where data are stored: 196.160.23.123¥hoge¥hogehoge; instruction of user or automatic: a process is performed in response to an instruction of the user". In step S17, the projection condition is set such that "projection instruction: in response of an input by the user; and terminal for instruction: from the current smartphone". Further, two sheets of originals are scanned by the MFP 13 and the scanned two originals are projected by the projector 14.

Figure 14:
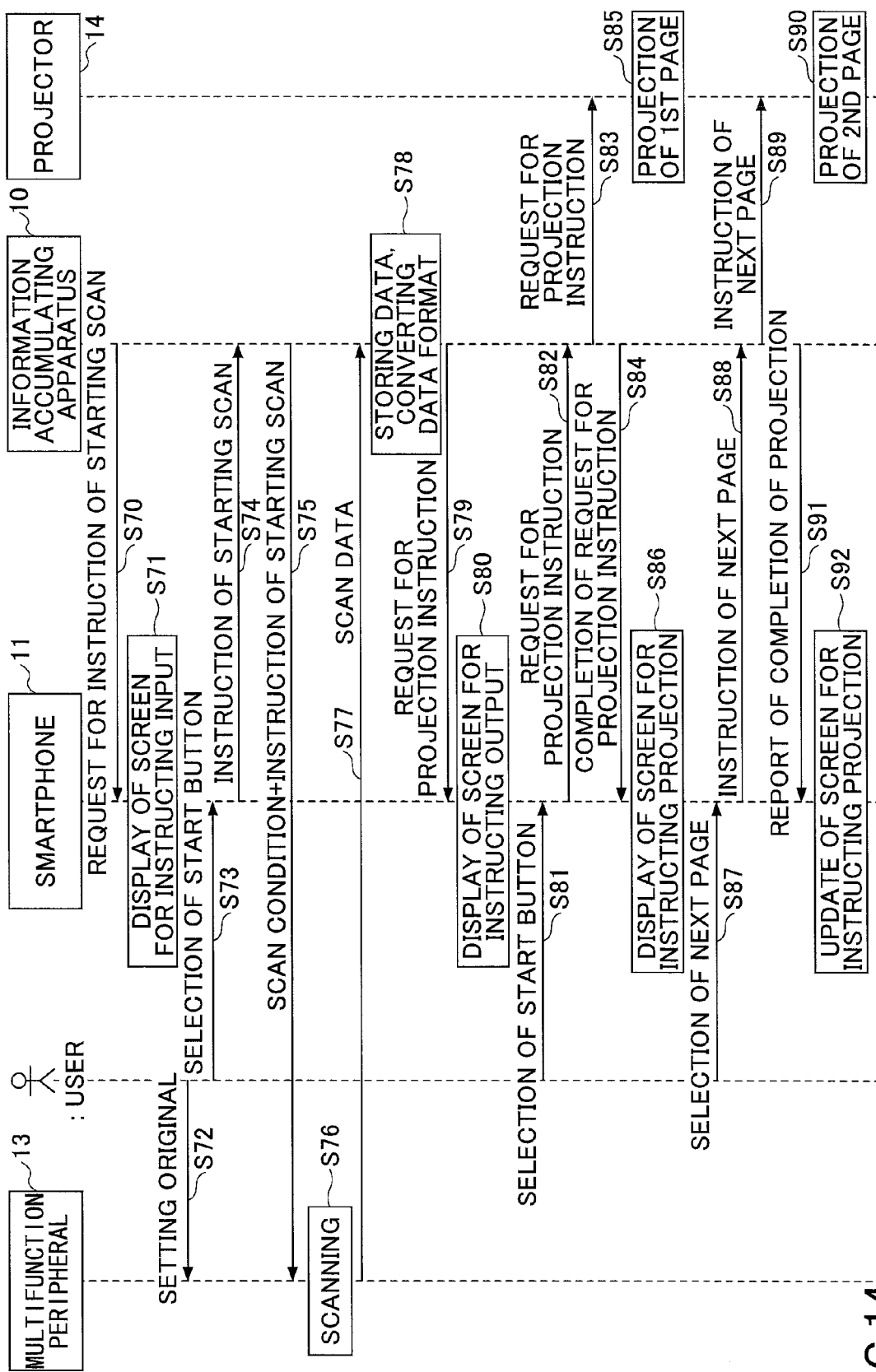
FIG. 14 illustrates an exemplary process of a workflow of the embodiment.

FIG. 14 illustrates an exemplary process of a workflow of the first embodiment. In a manner similar to step S20 of FIG. 7, the information accumulating apparatus 10 sends a request for input instruction to the smartphone 11 in step S70.

Figure 15:
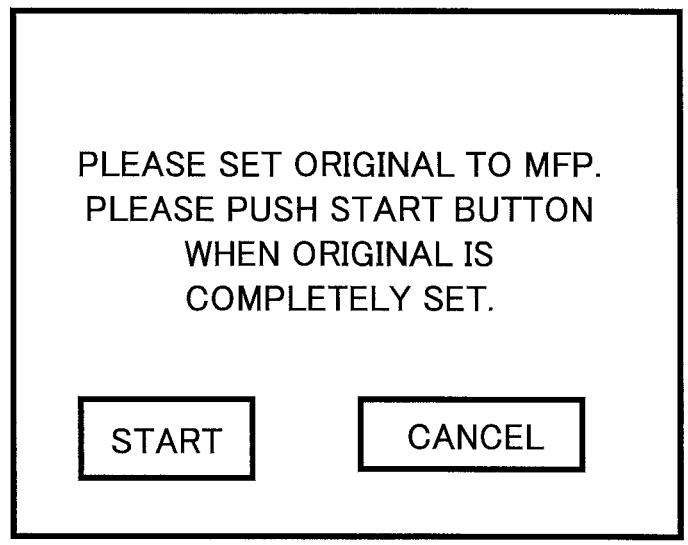
FIG. 15 illustrates an exemplary image of a screen for instructing an input.

When the request for the input instruction is received, in step S71, the smartphone 11 displays a screen prompting an input as illustrated in FIG. 15. FIG. 15 illustrates an exemplary image of a screen for instructing the input (the screen for the input instruction). In step S72, the user sets the two sheets of originals to the MFP 13 in conformity with the displayed screen for the input instruction. In step S73, the user selects a "start" button illustrated in FIG. 15 displayed on the smartphone 11.

When the "start" button is selected, the smartphone 11 sends the instruction of starting scan to the information accumulating apparatus 10 in step S74. When the information accumulating apparatus 10 receives an instruction of starting scan from the smartphone 11, the information accumulating apparatus 10 sends a scan condition and an instruction of staring scan in step S75.

When the MFP 13 receives the scan condition and the instruction of starting scan from the information accumulating apparatus 10, the MFP 13 starts scan of the original set by the user in step S72 in conformity with the scan condition in step S76. In step S77, the MFP 13 sends the scanned image data obtained in step S76 to the information accumulating apparatus. In step S78, the information accumulating apparatus 10 causes the received scan data to be stored in "196.160.23.123¥hoge¥hogehoge" and changes the data format of the received scan data to a data format which can be displayed by the projector 14.

At this time, the information accumulating apparatus 10 may hold information of a data format, to which the received scan data are changed, as an apparatus management table illustrated in FIG. 16 to enable data conversion in conformity with the apparatus, which performs the input and output process. FIG. 16 is an exemplary structural view of the apparatus management table.

Further, when the smartphone 11 acquires information from the projector 14 as in the above process, the projector 14 acquires the corresponding data format, the smartphone 11 sends the corresponding data format along with the workflow information to the information accumulating apparatus 10, and the information accumulating apparatus 10 may converts the data format based on the corresponding data format sent from the smartphone 11 to the information accumulating apparatus 10.

Figure 17:
FIG. 17 illustrates an exemplary image of a screen for instructing an output.

After the data format is completely converted, the information accumulating apparatus 10 sends a request for instructing projection (a request for a projection instruction) in step S79. When the request for the projection instruction is received, the smartphone 11 displays the screen for instructing an output (a screen for an output instruction) as illustrated in FIG. 17 in step S80. FIG. 17 illustrates an exemplary image of an exemplary screen for the output instruction. In step S81, the user selects a "start" button displayed on the smartphone 11.

When the "start" button is selected, the smartphone 11 sends the projection instruction to the information accumulating apparatus 10 in step S82. When the projection instruction is received, the information accumulating apparatus 10 sends the converted data and the projection instruction to the projector 14 in step S83. After the projection instruction is sent to the projector 14, the information accumulating apparatus 10 reports that the projection instruction is completed to the smartphone in step S84.

Figure 18:
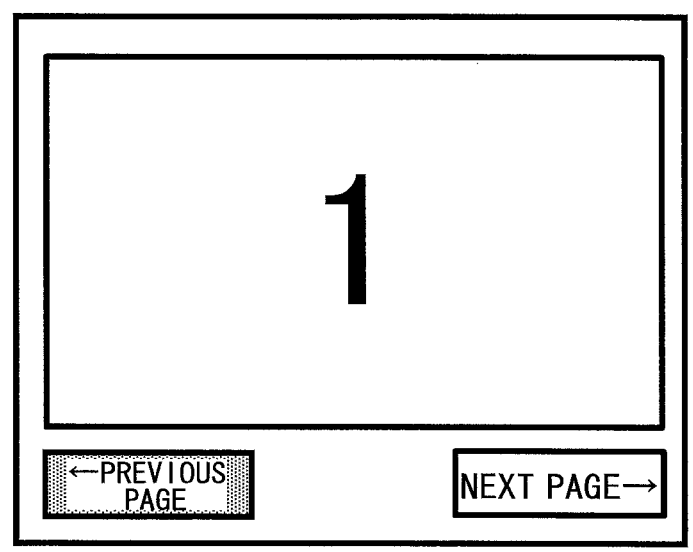
FIG. 18 illustrates an exemplary image of a screen for instructing a projection.

After the projection instruction is received, the projector 14 projects the first page of the image in step S85. Further, the completion of the projection instruction is reported from the information accumulating apparatus 10 to the smartphone 11, a screen for instructing the projection (a screen for an input instruction) illustrated in FIG. 18 is displayed in step S86. FIG. 18 illustrates an exemplary image of a screen for the projection instruction. Because the screen for the projection instruction illustrated in FIG. 18 displays the first page, the previous page cannot be selected. As illustrated in FIG. 18, a preview of the image projected to the projector 14 may be displayed on the screen for the projection instruction.

In step S87, the user selects a button of "next page" on the screen for projection instruction displayed on the smartphone 11. When the button of "next page" is selected, the smartphone 11 sends the projection instruction included in the next page to the information accumulating apparatus 10 in step S88. When the projection instruction on the next page is received, the information accumulating apparatus 10 sends the projection instruction on the next page to the projector 14 in step S89. When the projector 14 receives the projection instruction on the next page, the projector projects the second page in step S90.

After the projection instruction is sent to the projector 14, the information accumulating apparatus 10 reports that the projection instruction is completed to the smartphone in step S91. When the smartphone 11 receives the report of the completion of the projection, the smartphone 11 updates the screen for the projection instruction so that a preview of the second page is displayed as illustrated in FIG. 19 in step S92.

Figure 19:
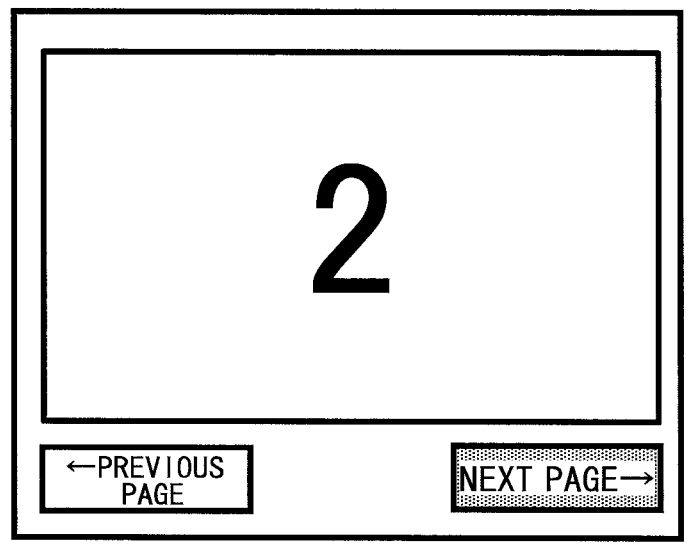
FIG. 19 illustrates an exemplary image of another screen for instructing a projection.

Because the second page of the screen for the projection instruction is displayed in FIG. 19, the button of "previous page", which cannot be selected at a time of displaying the first page, can be selected. Because the screen for the projection instruction illustrated in FIG. 19 displays the second page (the last page), the next page cannot be selected.

When a button of "cancel" is selected in steps S71 and S80, the smartphone 11 sends an instruction of stopping the workflow to the information accumulating apparatus 10. When the information accumulating apparatus 10 receives the instruction of stopping the workflow, the performed workflow is stopped.

In the above process, the projection instruction is given from the smartphone 11. However, in a case where the projection instruction is given from the smartphone 11, the projection data or the projection instruction may be directly sent to the projector 14 from the smartphone 11 instead of providing the projection instruction to the projector 14 through the information accumulating apparatus 10. A process of providing the projection instruction from the smartphone 11 to the projector 14 is described with reference to FIG. 20.

Figure 20:
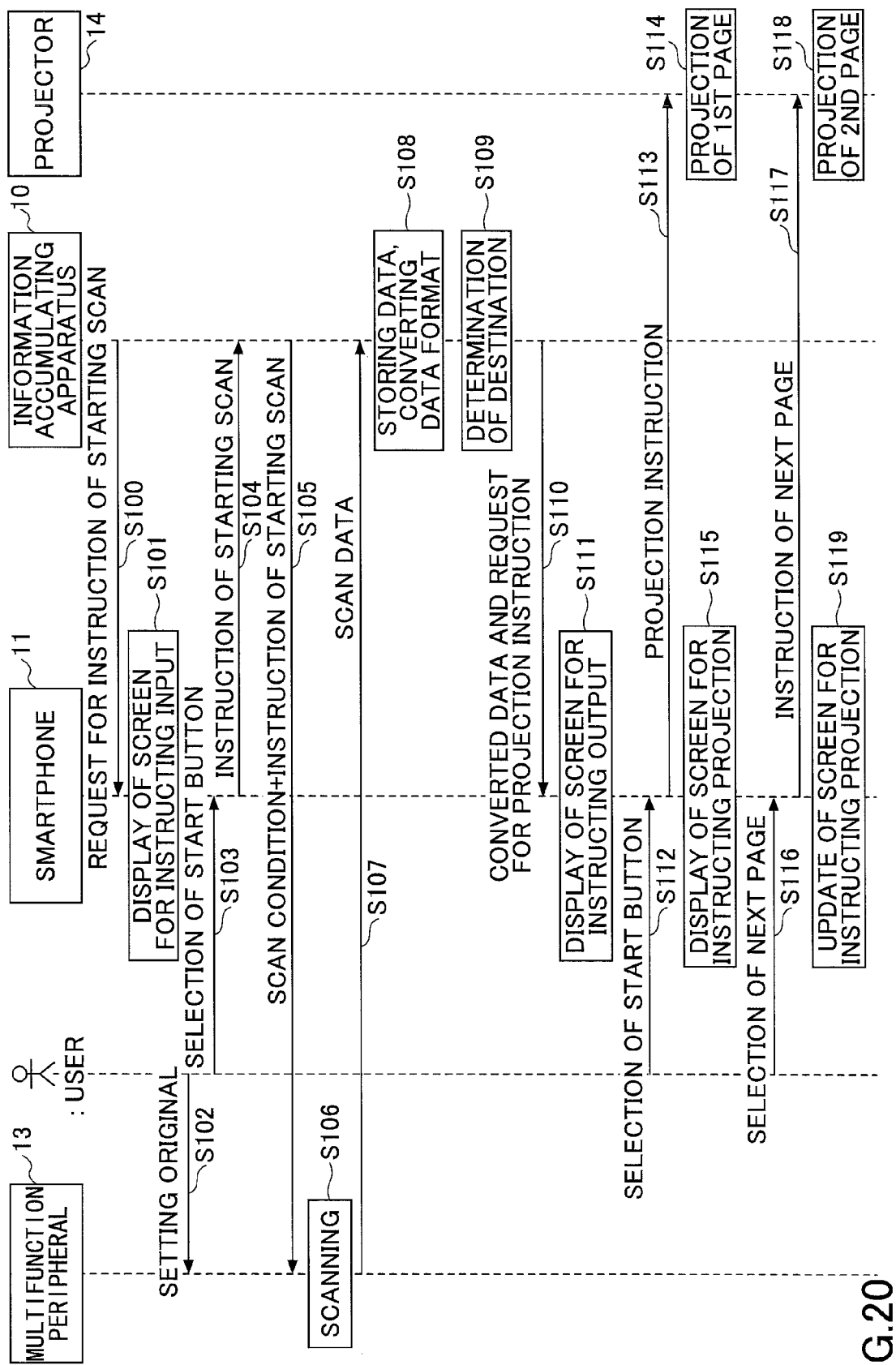
FIG. 20 illustrates an exemplary process of a workflow in a case of instructing a projection to a projector from a smartphone.

FIG. 20 illustrates an exemplary process of a workflow in a case of instructing a projection from a smartphone to a projector. Because the processes of steps S100 to S108 are similar to the processes of steps S70 to S78 of FIG. 14, explanation is omitted.

After the data format is converted in step S108, the information accumulating apparatus 10 determines whether a destination of the converted data is the projector 14 or the smartphone 11 from the setup of the workflow in step S109.

As to the determination of the destination, for example, if it is possible to directly connect the smartphone 11 with the projector 14 used for the workflow (possible to send the projection instruction), the converted data and the request for the projection instruction are sent to the smartphone 11. If it is not possible to directly connect the smartphone 11 with the projector 14 used for the workflow, the same processes as step S79 and the following steps illustrated in FIG. 14 may be performed. Further, if the projection condition includes "projection instruction: in response to an input by a user", the information accumulating apparatus 10 sends the converted data and the request for the projection instruction in step S110, and if the projection condition includes "projection instruction: automatic", the same processes as step S79 and the following steps in FIG. 14 may be performed.

Further, only if the projection condition includes "it is possible to directly connect with the smartphone" and "projection instruction: in response to the input by the user", the information accumulating apparatus 10 may send the converted data and the request for the projection instruction to the smartphone 11. In other cases, the same processes as step S79 and the following steps in FIG. 14 may be performed.

Next, processes after proceeding to step S110 are described. When the smartphone 11 receives the converted data and the request for the projection instruction from the information accumulating apparatus 10, the smartphone 11 displays the screen for the output instruction as illustrated in FIG. 17 in step S111. When the user selects the button of "start" on the screen for the output instruction in step S112, the smartphone 11 sends the projection instruction to the projector 14 in step S113.

After the projector 14 receives the projection instruction, the projector 14 projects the first page of the image in step S114. Further, the smartphone 11 displays the screen for the projection instruction as illustrated in FIG. 18 after the projection instruction to the projector 14 is completed in step S115.

Although it is not illustrated, when the projector 14 completes the projection, a report of completion of the projection may be sent to the smartphone 11. After the report of completion of the projection is received by the smartphone 11, the smartphone 11 may display a screen for the projection instruction.

In step S116, the user selects a button of "next page" on the screen for the projection instruction displayed on the smartphone 11. When the button of "next page" is selected, the smartphone 11 sends the projection instruction included in the next page (the second page) to the projector 14 in step S117. When the projector 14 receives the projection instruction on the next page, the projector projects the second page in step S118.

Further, the smartphone 11 updates the screen for the projection instruction as illustrated in FIG. 19 after the projection instruction to the projector 14 is completed in step S119. Although it is not illustrated, after the projection of the second page is completed, the screen for the projection instruction may be updated by the smartphone 11 after the smartphone 11 receives the report of the completion of the projection from the projector 14.

Further, although the image is projected using the smartphone 11 in the above processes, the embodiment is not limited to this mode. For example, the projection instruction may be given from another smartphone 11-1. In this case, the other smartphone 11-1, the projector 14, and the information accumulating may be operated so that the processes of step S110 and the following steps are performed by the other smartphone 11-1.

《Service Providing System 1 and Procedure of Other Processes》

The procedure of the processes in the service providing system 1 of the first embodiment is not limited to the above. Various structures may be applicable such as a structure of sending the input and output instructions from the information accumulating apparatus 10 to the input and output apparatus 10, a structure of converting the scan data in the smartphone 11, a structure of sending the projection data to the projector 14 through the smartphone 11, or the like.

Further, in a case where multiple workflows are simultaneously performed by the information accumulating apparatus 10, the received data and instructions are sent and received together with workflow identification information illustrated in FIG. 21 so that which workflow the received data and instructions are determined to be used. Thus, the multiple workflows can be simultaneously performed.

<General Overview>

Hereinafter, according to the service providing system 1 of the first embodiment, the user can acquire information such as the QR code for determining the electronic apparatus such as the MFP 13 or the projector 14 by bringing the operation terminal such as the smartphone or the tablet terminal 12 to the electronic apparatus. Thus, the user can easily designate the electronic apparatus for inputting the electronic data and the electronic apparatus for outputting the electronic data out of the multiple electronic apparatuses.

Accordingly, within the service providing system 1 of the first embodiment, the user can cause the operation terminal and the information processing apparatus such as the information accumulating apparatus 10 to cooperate each other to control the at least one electronic apparatus. Thus, various services such as the input service, the output service, and the input and output services can be used.

A service information acquiring unit in claims corresponds to a workflow list acquiring unit 33. A receiving unit in the claims corresponds to a workflow selection receiving unit 34. A apparatus information acquiring unit in the claims corresponds to a setup receiving unit 35. An apparatus information sending unit in the claims corresponds to a workflow information sending unit 36. A service providing unit in the claims corresponds to a WebApi 26.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the service providing system has been described in detail, it should be understood that various changes, substitutions, and alterations could be made thereto without departing from the spirit and scope of the invention.

This application is based upon and claims the benefit of priority of the prior Japanese Patent Application No. 2013-100632, filed on May 10, 2013, and the Japanese Patent Application No. 2014-089897, filed on Apr. 24, 2014, the entire contents of which are incorporated herein by reference.

What is claimed is:

1. A service providing system comprising:
an operation terminal;
an information processing apparatus;
an input apparatus having an image capturing function or an audio input function, the input apparatus not being a part of the operation terminal; and
an output apparatus having an image forming function corresponding to the image capturing function or an audio output function corresponding to the audio input function; and
wherein the operation terminal includes
a process information acquiring unit that acquires process information indicative of the at least one process from the information processing apparatus, the process including
an input process of causing electronic data to be input into the information processing apparatus from the input apparatus using the image capturing function or the audio input function, and
an output process of causing the input electronic data to be output from the output apparatus using the image forming function corresponding to the image capturing function or the audio output function corresponding to the audio input function,
a receiving unit that receives a selection of one process out of the at least one process indicated by the process information,
an apparatus information acquiring unit that acquires input apparatus information determining the input apparatus for the selected one process, and output apparatus information determining the output apparatus for the selected one process,
an apparatus information sending unit that sends the input and output apparatus information acquired by the apparatus information acquiring unit to the information processing apparatus through an interface that is previously defined in response to the one process, of which selection is received by the receiving unit,
wherein the information processing apparatus includes
a process information sending unit that sends the process information to the operation terminal, and
a process performing unit that performs the one process by controlling the input apparatus determined by the input apparatus information and the output apparatus determined by the output apparatus information by a cooperation method corresponding to the one process.

2. The service providing system according to claim 1, wherein the input apparatus information includes
connection information for connecting with the input apparatus, and
information indicative of the process which can be performed by the input apparatus, and
the output apparatus information includes
connection information for connecting with the output apparatus, and
information indicative of the process which can be performed by the output apparatus.

3. The service providing system according to claim 1, wherein the process performing unit of the information processing apparatus sends the electronic data to the operation terminal when the output apparatus can directly connect with the operation terminal, and sends an instruction to output the electronic data to the output apparatus when the output apparatus cannot directly connect with the operation terminal.

4. The service providing system according to claim 1, wherein the receiving unit of the operation terminal receives an input of an input condition of the input process included in the one process and an input of an output condition of the output process included in the one process, the apparatus information sending unit of the operation terminal sends the input condition and the output condition, together with the input and output apparatus information acquired by the apparatus information acquiring unit, to the information processing apparatus through the interface that is previously defined in response to the one process, of which selection is received by the receiving unit, and the process performing unit of the information processing apparatus performs the input process based on the input condition using the input apparatus and the output process based on the output condition using the output apparatus.

5. The service providing system according to claim 1,
wherein the input apparatus is an image reading apparatus which reads an original and generates image data,
wherein the output apparatus is an image projection apparatus which projects and outputs the image data, or an image display apparatus which displays and outputs the image data.

6. The service providing system according to claim 1,
wherein the apparatus information acquiring unit of the operation terminal acquires the input apparatus information and the output apparatus information from image data captured by the operation terminal.

7. The service providing system according to claim 1,
wherein the information processing apparatus includes a folder corresponding to each of the at least one process of outputting the electronic data, which is input into the information processing apparatus from the input apparatus, from the output apparatus,
wherein the apparatus information sending unit of the operation terminal sends and stores the input apparatus information and the output apparatus information to the folder corresponding to the one process,
wherein the process performing unit of the information processing apparatus performs the one process by using the input apparatus determined by the input apparatus information stored in the folder corresponding to the one process and the output apparatus determined by the output apparatus information stored in the folder corresponding to the one process to control the input apparatus and the output apparatus by the cooperation method corresponding to the one process.

8. A method of providing at least one service with a service providing system including an operation terminal, and an information processing apparatus, an input apparatus having an image capturing function or an audio input function and not being a part of the operation terminal, and an output apparatus having an image forming function corresponding to the image capturing function or an audio output function corresponding to the audio input function,
wherein the operation terminal performs
acquiring process information indicative of the at least one process from the information processing apparatus, the process including
an input process of causing electronic data to be input into the information processing apparatus from the input apparatus using the image capturing function or the audio input function, and
an output process of causing the input electronic data to be output from an output apparatus using the image forming function corresponding to the image capturing function or the audio output function corresponding to the audio input function,
receiving a selection of one process out of the at least one process indicated by the process information,
acquiring
input apparatus information determining the input apparatus for the selected one process, and
output apparatus information determining the output apparatus for the selected one process, and
sending the input and output apparatus information acquired by the acquiring the process information to the information processing apparatus through an interface that is previously defined in response to the one service, of which selection is received by the receiving the selection of one process,
wherein the information processing apparatus performs
sending the process information to the operation terminal, and
performing the one process by controlling the input apparatus determined by the input apparatus information and the output apparatus determined by the output apparatus information by a cooperation method corresponding to the one process.

* * * * *